United States Patent [19]

Inamoto et al.

[11] 4,373,826
[45] Feb. 15, 1983

[54] FASTENER ASSEMBLY

[75] Inventors: Hiroshi Inamoto; Katsunobu Sobajima; Shoichi Miyoshi, all of Yokohama, Japan

[73] Assignees: Nissan Motor Co., Ltd.; Kato Hatsujo Kaisha, Ltd., both of Yokohama, Japan

[21] Appl. No.: 161,481

[22] Filed: Jun. 20, 1980

[30] Foreign Application Priority Data

Jun. 26, 1979 [JP] Japan .................................. 54-80419

[51] Int. Cl.³ .............................................. E04B 1/38
[52] U.S. Cl. ....................................... 403/14; 24/214; 24/297; 52/507; 403/348; 403/406; 411/508
[58] Field of Search ................. 403/14, 408, 406, 348; 24/305, 297, 213 R, 213 B, 214, 221 R; 411/508, 509, 510; 52/507

[56] References Cited

U.S. PATENT DOCUMENTS

| | | | |
|---|---|---|---|
| 3,154,281 | 10/1964 | Frank | 24/214 X |
| 3,577,608 | 5/1971 | Texler | 24/221 R |
| 3,764,729 | 10/1973 | Kowalewski | 24/221 R X |
| 3,852,849 | 12/1974 | Pestka | 24/221 R X |
| 3,897,967 | 8/1975 | Barenyi | 24/297 |
| 3,954,344 | 5/1976 | Nakama | 403/14 |
| 4,114,339 | 9/1978 | Ito | 24/214 X |
| 4,231,675 | 11/1980 | Scozzafaja | 403/348 X |
| 4,261,151 | 4/1981 | Ito | 24/214 X |
| 4,285,103 | 8/1981 | Inamoto | 24/297 X |

FOREIGN PATENT DOCUMENTS

| | | | |
|---|---|---|---|
| 1949238 | 4/1970 | Fed. Rep. of Germany | 411/509 |
| 2001314 | 6/1978 | Fed. Rep. of Germany | 403/14 |

Primary Examiner—Thomas J. Holko
Attorney, Agent, or Firm—James C. Wray

[57] ABSTRACT

A fastener assembly is disclosed which comprises a clip for mounting a constituent member to a corresponding receiving member. A socket portion is integrally formed on the constituent member, which socket portion has a cylindrical opening with a pair of engaging projections extending from opposing inner peripheral surface portions of the opening toward each other. The clip has a shaft, a support portion formed at a longitudinal central portion of the shaft and adapted to fit in the opening of the socket portion, a pair of spearhead-shaped snap portions formed at opposite ends of the shaft, one of which snap portions is adapted to fit in the opening of the socket portion and engage the projections, and small flexible bosses which retain said one of the snap portions in the opening when this snap portion is disengaged from the projections. A mounting hole is bored on the receiving member so as to receive the other one of the snap portions. When the clip is at a first angular position with respect to the mounting hole, the two snap portions engage the projections of the socket portion and the edges of said mounting hole, respectively, so as to mount the constituent member to the receiving member, while when the clip is turned to a second angular position, the constituent member can be removed from the receiving member with the clip carried by the constituent member.

4 Claims, 6 Drawing Figures

FASTENER ASSEMBLY

BACKGROUND OF THE INVENTION

1. Field of the Invention

The present invention relates to a fastener assembly for mounting a constituent member of various types to a receiving member corresponding thereto.

2. Description of the Prior Art

To mount a constituent member of an apparatus to a receiving member thereof, metallic fastening means such as screws and bolts and nuts are generally used. The conventional metallic fastening means have drawbacks in that the process of mounting by using such metallic means is complicated, and especially when the constituent member is fastened at a number of points, the workability of the metallic fastening means is very low. Besides, the metallic fastening means sometimes rust, and the appearance of the fastened portion tends to become unseemly. When the metallic fastening means are used for mounting constituent members made by molding resins, the fastened portions of the constituent members may be exposed to stress concentration, which leads to breakage of the members.

To overcome the drawbacks of the metallic fastening means, resin clips of various types have been proposed for resiliently mounting or fastening constituent members to receiving members corresponding thereto. The resin clips of the prior art provide some improvement of the workability by the so-called one-touch mounting, and provide effects of preventing rust and protecting constituent members during mounting operations. However, the resin clips of the prior art have shortcomings in that, when a constituent member of an apparatus is disassembled or removed from a receiving member corresponding thereto, at least that portion of the resin clip which is fitted in either of the constituent member and receiving member must be elastically deformed by a suitable tool for releasing the locking engagement therebetween, so that the workability of the resin clips during the disassembling is generally lower than that of the metallic fastening means, e.g., screws and bolts and nuts. If the resin clips are broken at the time of disassembling and remain in the receiving member, cumbersome process of removing the residual portion of the resin clip from the receiving member is necessary before reassembling the constituent member thereto.

SUMMARY OF THE INVENTION

An object of the present invention is to obviate the above-mentioned shortcomings of the prior art, by providing an improved fastener assembly which simplifies mounting and dismounting of constituent members. Especially, when a constituent member is dismounted from a receiving member corresponding thereto, the fastener assembly of the present invention allows a clip thereof to remain in the constituent member, so that a high workability is ensured even at the time of re-assembling the constituent member to the receiving member.

According to the present invention, there is provided a fastener assembly for mounting a constituent member to a receiving member corresponding thereto, comprising: a hollow cylindrical socket portion integrally formed on the constituent member, said socket portion having a cylindrical opening with a pair of engaging projections extending toward each other in the opening; a clip having a shaft, a support portion formed at a longitudinal central portion of the shaft and adapted to fit in said opening of the socket portion, a pair of spearhead-shaped snap portions formed at opposite ends of said shaft, whose ends are in the proximity of said support potion, one of which snap portions being adapted to fit in said opening of said socket portion and engage said engaging projections, and means to retain said one of the snap portions in said opening when said one of the snap portions is disengaged from said engaging projections; said receiving member being formed with a mounting hole so as to receive the other one of said pair of snap portions, said mounting hole having such a shape that, at a first angular position of said clip relative to the mounting hole, said hole snap portion securely engages edges of said mounting hole, while when said clip is at a second angular position, said other snap portion is disengaged from said edges of said mounting hole and said constituent member is removable from the receiving member with said clip carried by the constituent member.

Advantageously, said retaining means comprises at least one small flexible boss formed on said shaft substantially in a plane passing the ends of the spearhead-shaped snap portion to be fitted in said socket, said small boss being angularly offset from said spearhead-shaped snap portion.

In a preferred embodiment of the invention, that snap portion which fits in the socket portion has a tool-engaging groove formed on that end surface thereof which is remote from said support portion.

A fastener assembly according to the present invention may include one or more guide members formed on that surface of the socket portion which comes in contact with the receiving member, said guide members being adapted to fit in the mounting hole so as to guide the snap portion of the clip relative to the mounting hole.

BRIEF DESCRIPTION OF THE DRAWINGS

For a better understanding of the invention, reference is made to the accompanying drawing, in which.

DESCRIPTION OF THE PREFERRED EMBODIMENTS

A preferred embodiment of the present invention will be now described in detail, which is used to assemble a constituent member, e.g., a radiator grill, to a receiving member, e.g., a radiator core support.

Figure 1:
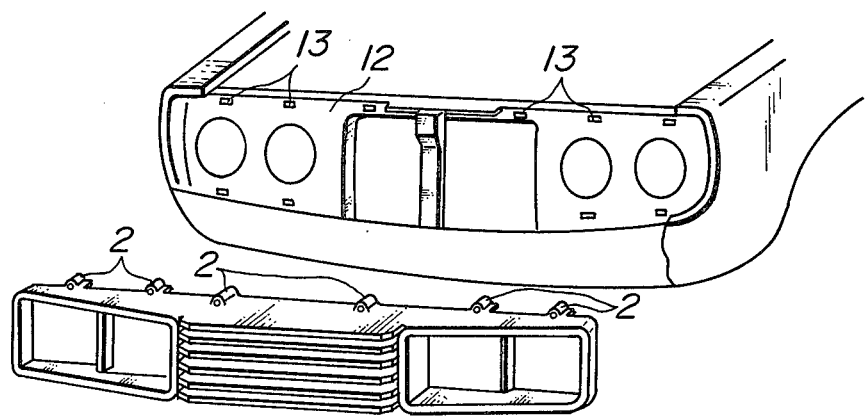
FIG. 1 is a schematic perspective view of a radiator grill and a radiator core support, representing a constituent member and a receiving member, respectively, to which fastener assemblies according to the present invention are applied.
Figure 2:
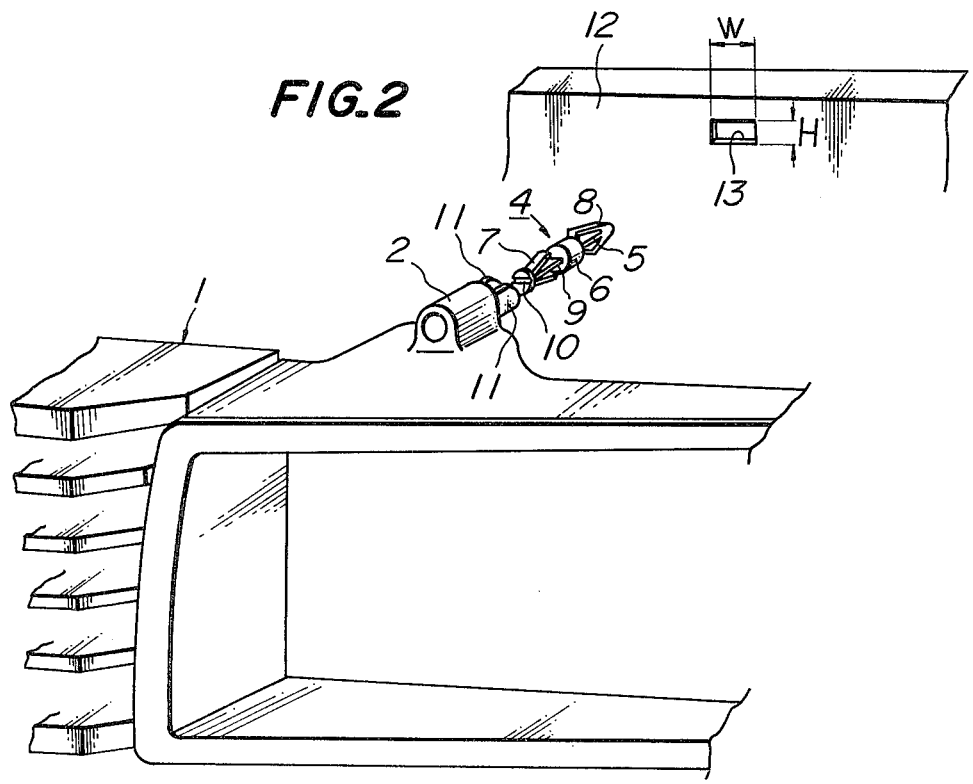
FIG. 2 is a schematic perspective view, showing the relationship among a socket portion, a clip, and a mounting hole of the fastener assembly of the present invention.
Figure 3A:
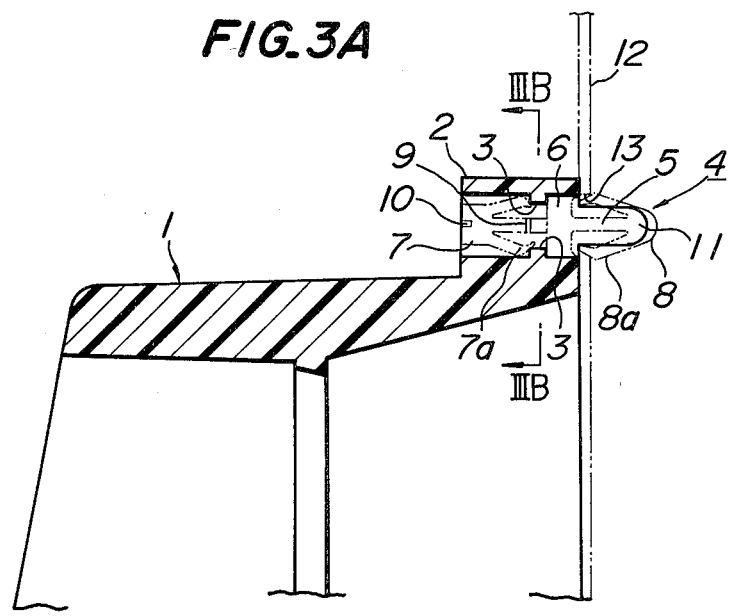
FIG. 3A is a longitudinal-sectional view of a socket portion.
Figure 3B:
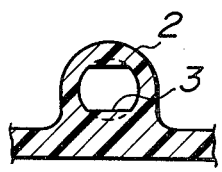
FIG. 3B is a cross-sectional view taken along the line IIIB—IIIB of FIG. 3A.
Figure 4A:
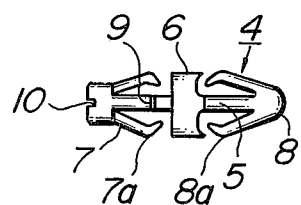
FIG. 4A is a side view of the clip.
Figure 4B:
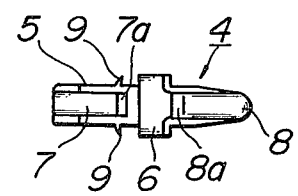
FIG. 4B is a plan view of the clip.

Referring to FIG. 1 through FIG. 4B, a radiator grill 1 made of a suitable resin has a plurality of socket portions 2 integrally formed on the rear end periphery thereof. Each socket portion 2 has a substantially cylindrical hole or opening extending from the front side to the rear side of the radiator grill. A pair of engaging projections 3, 3 are formed on the upper and lower portions of the inner peripheral surface of the cylindrical opening, as best shown in FIG. 3B. A clip 4 made of a suitable resin material has a somewhat flattened shaft portion 5 and a disc-shaped support portion 6 formed at the central portion of the shaft portion. The diameter of the disc-shaped support portion 6 is slightly smaller than the diameter of the cylindrical opening of the socket portion 2, so that the support portion 6 fits in the opening of the socket portion 2 and engages the engaging projections 3 to position the clip 4. Spearhead-shaped snap portions 7 and 8 are integrally formed on the shaft portion 5 at opposite ends thereof, with pointed ends of the spearhead-shapes located remote from the support portion 6. One of the spearhead-shaped snap portions, e.g., the snap portion 7, fits in the opening of the socket portion 2, so that when the support portion 6 engages one side surface of the engaging projections 3, the rear ends 7a of the spearhead-shaped snap portion 7 engage the opposite surface of the engaging projections 3. Consequently, the clip 4 is mounted on the socket portion 2 with the one snap portion 7 securely attached to the engaging projections 3, while holding the rear ends 8a of the other snap portion 8 of the clip 4 away from that end surface of the socket portion 2 which comes in contact with a radiator core support 12. The radiator core support 12 has a mounting hole 13, as shown in FIG. 2 and FIG. 3A. When the clip 4 is registered in position in the socket portion 2, the distance between the above-mentioned end surface of the socket portion 2 and the rear ends 8a of the snap portion 8 is such that, as the above-mentioned end surface of the socket portion 2 tightly engages one surface of the radiator core support 12, the rear ends 8a of the snap portion 8 engage an opposite surface of the radiator core support 12 along peripheral edges of the mounting hole 13.

One or more flexible small bosses 9 are integrally formed on the shaft portion 5 of the snap portion 7, which small bosses are on a plane perpendicular to the shaft 5 and passing the rear ends 7a of the spearhead-shaped snap portion 7. The small bosses 9 are angularly offset from the snap portion 7 by 90 degrees and adapted to engage the projections 3 of the socket portion 2 when the rear ends 7a of the snap portion 7 are disengaged from the projections 3. The illustrated embodiment of the invention has a tool-engaging groove 10 formed at the front end of the snap portion 7, so as to facilitate application of a screw driver (not shown) or the like tool to the clip 4.

The socket portion 2 of the illustrated embodiment has guide pieces 11, 11 integrally formed at opposing sides of the cylindrical opening thereof, so as to extend away from that surface of the socket portion 2 which comes in contact with the radiator core support 12. The guide pieces 11, 11 are formed with generally semi-circular ends. Thus, the guide pieces 11, 11 serve to guide the insertion of the snap portion 8 into the mounting hole 13 bored on the radiator core support 12.

The mounting hole 13 of the radiator core support 12 has a height H slightly smaller than the width of the rear end portions 8a of the spearhead-shaped snap portion 8 of the clip 4, and a width W broad enough for receiving the guide pieces 11, 11 therein.

The fastener assembly of the above-mentioned construction is used to mount the radiator grill 1 to the radiator core support 12 in the following manner. At first, the clip 4 is secured to the socket portion 2 of the radiator grill 1 by inserting the snap portion 7 of the clip 4 into the cylindrical opening of the socket portion 2 until the support portion 6 engages one side of the projections 3 of the socket portion 2 while the rear ends 7a of the snap portion 7 engage the opposite side of the projections 3. Then, the other snap portion 8 of the clip 4 is inserted into the mounting hole 13 of the radiator core support 12 together with the guide pieces 11, 11 of the socket portion 2, by moving the radiator grill 1 toward the radiator core support 12 with the clip 4 aligned with the mounting hole 13. In this instance, when the rear surface of the socket portion 2 comes into tight contact with the front surface of the radiator core support 12, the snap portion 8 engages the peripheral edges of the mounting hole 13 for securely holding the socket portion 2 of the radiator grill 1 on the radiator core support 12. Thus, the radiator grill 1 can be securely mounted on the radiator core support 12 by a simple one-touch operation.

To remove the radiator grill 1 from the radiator core support 12 for repair or the like, a screw driver (not shown) or the like tool is applied to the tool-engaging groove 10 at the end surface of the snap portion 7 through a front part of the cylindrical opening of the socket portion 2. As the clip 4 is turned by 90 degrees by rotating the screw driver, the rear ends 8a of the other side spearhead-shaped snap portion 8 leave the edges of the mounting hole 13 and enter the space between the guide pieces 11, 11 so that the clip becomes removable from the mounting hole 13 of the radiator core support 12. Thus, the radiator grill 1 can be easily removed from the radiator core support 12. In this instance, the small bosses 9 of the clip 4 on the side of the snap portion 7 are brought in engagement with the projections 3 of the socket portion 2, so that the clip 4 remains securely mounted on the projections 3 of the socket portion 2 even after the radiator grill 1 is removed from the radiator core support 12. The guide pieces 11, 11 not only guide the insertion of the snap portion 8 into the mounting hole 13, but also prevent the snap portion 8 from being caught by the edges of the mounting hole 13 when the radiator grill 1 is removed from the radiator core support 12. Thus, the guide pieces 11, 11 ensure that the clip 4 is held by the socket portion 2 during disassembling of a constituent member, e.g., the radiator grill 1, from a receiving member, e.g., the radiator core support 12.

It is noted here that when the radiator grill 1 is separated from the radiator core support 12, the central support portion 6 of the clip 4 is fitted in the socket portion 2, and the small bosses 9 act to securely fasten the clip 4 to the socket portion 2. Thus, the clip 4 is prevented from moving back and forth within the socket portion 2 during transportation of the radiator grill 1.

To re-mount the radiator grill 1 on the radiator core support 12, the clip 4 is turned by 90 degrees by manually rotating the other side snap portion 8, and then the one-touch mounting of the radiator grill 1 onto the radiator core support 12 can be easily effected. It is of course possible to separate once the clip 4 from the socket portion 2 before the re-mounting and to re-insert the snap portion 7 into the socket portion 2 for securing the snap portion 7 to the engaging projections 3, so as to make the fastener assembly ready for the one-touch mounting.

The application of the fastener assembly of the present invention is not restricted only to the mounting of the automobile radiator grill, and the fastener assembly can be used for mounting constituent members of various kinds to receiving members therefor. The fastener assembly of the present invention is particularly useful in mounting a constituent member by fastening at a plurality of points thereof.

As described in the foregoing, with the fastener assembly of the present invention, a constituent member can be mounted on a receiving member through one-touch operation by inserting the clip therebetween, and the removal of the constituent member from the receiving member can be effected simply by turning the clip 90 degrees. Thus, the cumbersome operations of the prior art, such as elastic deformations of engaging portions of clips, can be eliminated, and the workability of dismounting the constituent members is considerably improved. Furthermore, when the constituent member is removed from the receiving member, the clip of the fastener assembly of the invention never remains in the receiving member but moves with the constituent member as a part securely carried thereby. Accordingly, the process of re-mounting the constituent member onto the receiving member is also simplified.

Although the invention has been described with reference to a specific embodiment, it is understood that the present disclosure has been made by way of example only, and numerous changes in details of the construction as well as the combination and arrangement of parts may be resorted to without departing from the scope of the invention.

What is claimed is:

1. A fastener assembly for mounting a constituent member to a receiving member corresponding thereto, comprising:
   a hollow cylindrical socket portion integrally formed on the constituent member, said socket portion having a cylindrical opening with a pair of engaging projections extending toward each other in the opening;
   a clip having a shaft, a support portion formed at a longitudinal central portion of the shaft and adapted to fit in said opening of the socket portion, a pair of spearhead-shaped snap portions formed at opposite ends of said shaft, whose ends are in the proximity of said support portion, one of which snap portions being adapted to fit in said opening of said socket portion and engage said engaging projections, and at least one small flexible boss formed on said shaft substantially in a plane passing the ends of the spearhead-shaped snap portion to be fitted in said socket, said small boss being angularly offset from said spearhead-shaped snap portion to retain said one of the snap portions in said opening when said one of the snap portions is disengaged from said engaging projections;
   said receiving member being formed with a mounting hole so as to receive the other one of said pair of snap portions, said mounting hole having such a shape that, at a first angular position of said clip relative to the mounting hole, said other snap portion securely engages edges of said mounting hole, while when said clip is at a second angular position, said other snap portion is disengaged from said edges of said mounting hole and said constituent member is removable from the receiving member with said clip carried by the constituent member.

2. A fastener assembly as claimed in claim 1, wherein said snap portion to be inserted in said socket portion has a tool-engaging groove formed at that end surface thereof which is remote from said support portion.

3. A fastener assembly as claimed in claim 1, wherein that surface of said socket portion which comes in contact with the receiving member has guide pieces adapted to guide insertion of said snap portion into said mounting hole.

4. A fastener assembly as claimed in claim 3, wherein said mounting hole has a height larger than a maximum height of the ends of said other spearhead-shaped snap portion but smaller than a maximum width of the said ends, and a width broad enough for receiving said guide pieces in said mounting hole.

* * * * *